United States Patent [19]

Staendeke et al.

[11] Patent Number: 4,467,056
[45] Date of Patent: Aug. 21, 1984

[54] PARTICULATE AGENT FOR IMPEDING THE COMBUSTIBILITY OF COMBUSTIBLE MATERIALS

[75] Inventors: Horst Staendeke; Franz-Josef Dany; Joachim Kandler, all of Erftstadt; Wilhelm Adam, Neu-Isenburg, all of Fed. Rep. of Germany

[73] Assignee: Hoechst Aktiengesellschaft, Fed. Rep. of Germany

[21] Appl. No.: 213,869

[22] Filed: Dec. 8, 1980

[30] Foreign Application Priority Data

Dec. 8, 1979 [DE] Fed. Rep. of Germany ....... 2949537

[51] Int. Cl.³ .................................................. C08K 9/10
[52] U.S. Cl. ..................................... 523/208; 523/179; 521/106; 521/136; 521/907; 524/416
[58] Field of Search ................ 524/416; 523/179, 208; 521/907, 106, 136

[56] References Cited

U.S. PATENT DOCUMENTS 3,134,742  5/1964  Wismer et al. ...................... 521/107
3,423,343  1/1969  Barnett ................................. 521/165
3,513,114  5/1970  Hahn et al. .......................... 524/317

Primary Examiner—Morton Foelak
Attorney, Agent, or Firm—Connolly and Hutz

[57] ABSTRACT

The invention relates to a particulate agent based on free-flowing pulverulent ammonium polyphosphates of the general formula $$H_{(n-m)+2}(NH_4)_m P_n O_{3n+1}$$

in which n is an integer having an average value of from approximately 20 to 800 and the ratio of m to n is approximately 1, for impeding the combustibility of combustible materials. The agent is comprised of
(a) approximately 75 to 99% by weight of ammonium polyphosphate, and
(b) approximately 1 to 25% by weight of a hardened water-insoluble polycondensation product of melamine and formaldehyde encasing the individual ammonium polyphosphate particles.

8 Claims, No Drawings

PARTICULATE AGENT FOR IMPEDING THE COMBUSTIBILITY OF COMBUSTIBLE MATERIALS

The present invention relates to a particulate agent based on free-flowing pulverulent ammonium polyphosphates for impeding the combustibility of combustible materials.

It is generally known to use ammonium polyphosphates as flame-protective agents for plastics materials. German Auslegeschrift No. 12 83 532, for example, describes a process for the manufacture of flame-retardant polyurethanes from high molecular-weight polyhydroxyl compounds, polyisocyanates and catalysts, an ammonium polyphosphate of the general formula $H_{(n-m)+2}(NH_4)_m P_n O_{3n+1}$, in which n is an integer having an average value of more than 10, m is an integer up to a maximum of n+2 and m/n lies between approximately 0.7 and 1.1, being suggested for use as a flame-retardant additive.

Although when used in polyurethanes, ammonium polyphosphates of the above-mentioned general formula impart good flame retardant properties to the polyurethanes, they have the disadvantage that they are insufficiently water-insoluble and therefore are washed out of the plastics material by the effects of weather in the course of time. As can be seen from column 3 of German Auslegeschrift No. 12 83 532, the ammonium polyphosphates are designated in that specification as being practically water-insoluble materials. Despite this, they have a noticeable solubility in water as results from the following: upon suspending 10 g of the ammonium polyphosphate in 100 cm$^3$ of water at 25° C., up to 5 g of the ammonium polyphosphate is dissolved; in other words, the soluble portions of the ammonium polyphosphate constitute up to 50% of the amount used.

It is therefore desirable to provide ways and means permitting the solubility of ammonium polyphosphates in water to be reduced so as to minimize the risk of the ammonium polyphosphate being washed out under outdoor conditions, when used as a flame-retardant agent in plastics materials.

To this end, the invention provides more particularly: a particulate agent based on free-flowing pulverulent ammonium polyphosphates of the general formula $H_{(n-m)+2}(NH_4)_m P_n O_{3n+1}$, in which n is an integer having an average value of from approximately 20 to 800 and the ratio of m to n is approximately 1, for impeding the combustibility of combustible materials, the agent being comprised of (a) approximately 75 to 99% by weight of ammonium polyphosphate; and (b) approximately 1 to 25% by weight of a hardened water-insoluble polycondensation product of melamine and formaldehyde encasing the individual ammonium polyphosphate particles.

The agent of the invention generally has a mean particle size of from approximately 0.01 to 0.05 mm and the degree of condensation n of the ammonium polyphosphate is preferably an integer having an average value of from 100 to 500, determined according to the end-group titration process (according to Wazer), Griffiter and McCullough, Anal. Chem. 26, page 1755 (1954).

According to a further preferred form of the agent according to the invention, the proportion of polycondensation product in the agent is from 2.5 to 10% by weight. The polycondensation product can also be a partially etherified product, for example, a methyl-etherified or ethyl-etherified product. In particular, a polycondensation product proved to be suitable that in its unhardened state is a powder a 50% by weight aqueous solution of which has a dynamic viscosity of 20 cP (mPa·s), a pH-value at 20° C. of from 8.8 to 9.8 and a density at 20° C. of from 1.21 to 1.225 (g/ml) and that is commercially available as Madurit ® MW 390 by Cassella Aktiengesellschaft, Frankfurt/Main.

Finally, the invention relates also to the use of the above-described agent for rendering polyurethanes and polyurethane foams flameproof, the content of the agent in polyurethane foam being from approximately 5 to 50% by weight, based on the amount of alcoholic component in the polyurethane.

The melamine/formaldehyde resin can be applied to the ammonium polyphosphate particles, for example, as follows: the ammonium polyphosphate is suspended in methanol, the suspension is heated until the methanol refluxes weakly and subsequently an aqueous methanolic solution of the melamine/formaldehyde resin is introduced dropwise into the suspension. After a post-reaction period of, for example, from 0.5 to 2 hours, the suspension is filtered and the filter residue is dried for 150 to 180 minutes in a stream of nitrogen at 100° C. The resin coating applied to the ammonium polyphosphate particles is dried and hardened simultaneously.

The ammonium polyphosphate encapsulated in this manner has the advantage that it is practically water-insoluble and, in this form, is ready for use, for example, as a flame-retardant agent in polyurethane foams. The difference in solubility between the agents according to the invention and conventional ammonium polyphosphates is demonstrated in the following Examples.

The encapsulation of the ammonium polyphosphates in no way impairs its known original effectiveness as a flame-retardant agent for plastics materials, especially for polyurethanes. In other words, the present agent and its use as a flame-retardant agent compare favorably with the prior art.

The following Examples illustrate the invention.

EXAMPLE 1

150 g of ammonium polyphosphate having a degree of condensation of n∼700 (Exolit ® 263, Hoechst Aktiengesellschaft, Frankfurt/Main) were suspended in 600 ml of methanol in a glass vessel equipped with an agitator and a reflux condenser, and the suspension was heated until the methanol refluxed weakly. Subsequently, 100 ml of an aqueous methanolic solution of 7.5 g of a melamine/formaldehyde resin (Madurit ® MW 390, Cassella Aktiengesellschaft, Frankfurt/Main) were introduced into the suspension dropwise, while stirring, over a period of 15 minutes. After a further after-reaction period of 2 hours, filtration was carried out and the filter residue was dried for 120 minutes in a stream of nitrogen at 100° C., during which time the resin coating hardened on the phosphate particles. 149.9 g of product, having a melamine/formaldehyde resin content of 5% by weight were obtained.

In order to determine the water-soluble portion of the resulting product, a sample of 10 g was removed and suspended in 100 ml of water, and the suspension was stirred for 20 minutes at 25° C. The portion of the product that had not dissolved in water was subsequently allowed to settle out over a period of 40 minutes and the solution was decanted. 50 ml of the still turbid solution were placed in a centrifuge jar and centrifuged for 40 minutes at 15,000 revolutions per minute. 5 ml of the clear centrifuged solution were then pipetted into a weighed aluminium dish and concentrated by evaporation in a drying chamber at 120° C. The solubility in water of the manufactured product was calculated from the amount of dry residue. The solubility value determined for this product is shown in the table hereinafter.

EXAMPLE 2

200 g of the ammonium polyphosphate of Example 1 were heated to 100° C. in a heated kneading machine and 100 ml of an aqueous methanolic solution containing 5 g of the melamine/formaldehyde resin mentioned in Example 1 were subsequently added thereto over a period of 15 minutes. The mixture was kneaded for 2 hours at from 100° to 150° C. during which time the solvent evaporated and the resin hardened. 200 g of encapsulated ammonium polyphosphate having a resin content of 2.5% by weight were obtained.

The solubility test result determined (cf. Example 1) for this product is shown in the following table.

EXAMPLE 3

The procedure was as in Example 2, but 10 g of the melamine/formaldehyde resin was used. The product yield was 203 g, and the product had a resin content of 4.9% by weight.

The solubility test result determined (cf. Example 1) for this product is shown in the following table.

EXAMPLE 4

The procedure was as in Example 2, but 20 g of the melamine/formaldehyde resin was used. The product yield was 211 g and the product had a resin content of 9.5% by weight.

The solubility test result determined (cf. Example 1) for this product is shown in the following table.

EXAMPLE 5

The procedure was as in Example 2, but 40 g of the melamine/formaldehyde resin was used. The product yield was 225 g, and the product had a resin content of 17.8% by weight.

The solubility test result determined (cf. Example 1) for this product is shown in the following table.

EXAMPLE 6 (Comparative Example)

The procedure was as in Example 2 but no melamine/formaldehyde resin was added.

The solubility test result determined (cf. Example 1) for this product is shown in the following table.

TABLE

| Example | I | II | III |
|---|---|---|---|
| 1 | 5.0 | 13.0 | — |
| 2 | 2.5 | 12.0 | −45.0 |
| 3 | 4.9 | 9.4 | −57.0 |
| 4 | 9.5 | 5.2 | −76.0 |
| 5 | 17.8 | 4.2 | −81.0 |
| 6 | — | 22.0 | — |

Column I: Content of melamine/formaldehyde resin in the end product (% by weight)
Column II: Portion of the end product soluble in water (% by weight) according to the solubility test in Example 1
Column III: Decrease in the water-soluble content of the products according to the invention of Examples 1 to 5 as a percentage compared with the water-solubility of the comparison product according to Example 6.

The table shows that the water-soluble portion of the ammonium polyphosphate decreases as the content of melamine/formaldehyde resin in the end product increases. In comparison with the untreated ammonium polyphosphate according to Example 6, the products according to the invention exhibit a considerably lower solubility in water.

We claim:

1. Particulate agent based on free-flowing pulverulent ammonium polyphosphates of the general formula

in which n is an integer having an average value of from approximately 20 to 800 and the ratio of m to n is approximately 1, for impeding the combustibility of combustible materials, comprising
    (a) approximately 75 to 99% by weight of ammonium polyphosphate; and
    (b) approximately 1 to 25% by weight of a hardened water-insoluble polycondensation product of melamine and formaldehyde encasing the individual ammonium polyphosphate particles.

2. Agent as claimed in claim 1, consisting of particles with a mean size of from approximately 0.01 to 0.05 mm.

3. Agent as claimed in claim 1, wherein n is an integer having an average value of from 100 to 500.

4. Agent as claimed in claim 1, containing the polycondensation product in a proportion of from 2.5 to 10% by weight.

5. Agent as claimed in claim 1, wherein the polycondensation product is a non-etherified or partially etherified product.

6. Agent as claimed in claim 1, wherein the polycondensation product in its unhardened state is a powder a 50% by weight aqueous solution of which has a dynamic viscosity of 20 mPa·s, a pH-value at 20° C. of from 8.8 to 9.8 and a density at 20° C. of from 1.21 to 1.225 (g/ml).

7. Agent as claimed in claim 1, for rendering polyurethanes and polyurethane foams flameproof, wherein the content of the agent in polyurethane foam is from approximately 5 to 50% by weight, based on the amount of alcoholic component in the polyurethane.

8. Agent as claimed in claim 1, consisting essentially of said encased particles, each encased particle consisting essentially of:
    a particle of said ammonium polyphosphate, and
    a coating encasing said particle and consisting essentially of the hardened, water-insoluble polycondensation product of melamine and formaldehyde.

* * * * *